US012744145B2

(12) United States Patent
Herr

(10) Patent No.: US 12,744,145 B2
(45) Date of Patent: Sep. 22, 2026

(54) METHOD AND SYSTEM FOR POLING A FERROELECTRIC MEDIUM

(71) Applicant: Fraunhofer-Gesellschaft zur Förderung der angewandten Forschung e.V., Munich (DE)

(72) Inventor: Simon J. Herr, Freiburg (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 150 days.

(21) Appl. No.: 18/952,465

(22) Filed: Nov. 19, 2024

(65) Prior Publication Data

US 2025/0166879 A1 May 22, 2025

(30) Foreign Application Priority Data

Nov. 21, 2023 (EP) .................................... 23211248

(51) Int. Cl.
*H01F 7/06* (2006.01)
*G02F 1/355* (2006.01)

(52) U.S. Cl.
CPC ........... *H01F 7/064* (2013.01); *G02F 1/3558* (2013.01)

(58) Field of Classification Search
CPC ............................... H01F 7/064; G02F 1/3558
See application file for complete search history.

(56) References Cited

U.S. PATENT DOCUMENTS 6,002,515 A * 12/1999 Mizuuchi .............. G02F 1/3558 359/332
7,093,509 B2 * 8/2006 Shao ...................... G01Q 60/30 73/866
7,112,263 B2 * 9/2006 Nihei .................... G02F 1/3558 29/25.35

(Continued)

FOREIGN PATENT DOCUMENTS

EP 2553692 B1 3/2016

OTHER PUBLICATIONS

Search Report dated Apr. 23, 2024, issued in corresponding European Patent Application No. 23211248.2.

*Primary Examiner* — Scott Bauer
(74) *Attorney, Agent, or Firm* — Procopio, Cory, Hargreaves & Savitch LLP

(57) ABSTRACT

Method of poling a ferroelectric medium applies a first contact surface of a first electrical contact to a first side surface section, the first contact surface smaller than the first side surface section, and applies a second contact surface of a second electrical contact to a second side surface, the second contact surface covering at least the second side surface section, and applies an electrical voltage between the first and second electrical contacts. Relative movement between the first contact surface and the ferroelectric medium in two mutually perpendicular directions sweeps the first contact surface over the first side surface section and a measure of a current flowing between the first electrical contact and the second electrical contact through the ferroelectric medium is detected and the electrical voltage controlled so that a deviation of the current from a nominal poling current is minimised. The second electrical contact is an ionic conductor.

15 Claims, 2 Drawing Sheets

(56) References Cited

U.S. PATENT DOCUMENTS

| | | | | |
|---|---|---|---|---|
| 2008/0179769 | A1* | 7/2008 | Roberts | G02F 1/3544<br>264/1.27 |
| 2008/0218846 | A1* | 9/2008 | Chu | G02F 1/3558<br>359/326 |
| 2008/0231942 | A1 | 9/2008 | Huang et al. | |
| 2014/0312385 | A1* | 10/2014 | Sluka | G11C 11/22<br>257/183.1 |
| 2019/0058068 | A1* | 2/2019 | Spanier | H01G 9/20 |
| 2021/0238767 | A1 | 8/2021 | Zhang et al. | |

* cited by examiner 11
1
6
20
5
10
8
10
19
4
3
9
12
13
2
7
14
17
16
15

1
11
18
6
10
8
10
20
4
19
5
2
3
9
12
13
7
17
14
16
15

METHOD AND SYSTEM FOR POLING A FERROELECTRIC MEDIUM

RELATED APPLICATION DATA

This application is based on and claims priority to EP 23211248.2, filed Nov. 21, 2023, the entire contents of which are incorporated herein by reference.

FIELD OF DISCLOSURE

The present invention relates to a method of poling a ferroelectric medium having a first side surface and a second side surface positioned opposite the first side surface, such that the ferroelectric medium comprises a first volume segment and a second volume segment, wherein the spontaneous polarisation of the ferroelectric medium comprises a first orientation in the first volume segment and a second orientation in the second volume segment, and wherein the first orientation and the second orientation are different from each other. The first volume segment is defined by a first side surface section of the first side surface and a second side surface section of the second side surface, and the second volume segment is defined by a third side surface section of the first side surface and a fourth side surface section of the second side surface. The method comprises the steps of: Providing the ferroelectric medium; applying a first contact surface of a first electrical contact to the first side surface section, wherein the first contact surface is smaller than the first side surface section; applying a second contact surface of a second electrical contact to the second side surface, wherein the second contact surface covers at least the second side surface section; applying an electrical voltage between the first electrical contact and the second electrical contact; carrying out a relative movement between the first contact surface and the ferroelectric medium in two mutually perpendicular directions so that the first contact surface sweeps the first side surface section; detecting a measure of a current flowing between the first electrical contact and the second electrical contact through the ferroelectric medium; and controlling the electrical voltage so that a deviation of the current from a nominal poling current is minimised.

The present invention also relates to a system for poling a ferroelectric medium having a first side surface and a second side surface positioned opposite the first side surface, such that the ferroelectric medium comprises a first volume segment and a second volume segment. The system comprises: a mount for receiving the ferroelectric medium during operation of the system; a first electrical contact with a first contact surface, wherein the first electrical contact is arranged and positioned such that the first contact surface can be applied to a first side surface section of the first side surface of the ferroelectric medium received on the mount during operation of the system; a second electrical contact having a second contact surface, wherein the second electrical contact is arranged and positioned such that the second contact surface can be applied to a second side surface section of the second side surface of the ferroelectric medium received in the mount during operation of the system; an electrical voltage source, wherein the voltage source is connected to the first and second electrical contacts such that, during operation of the system, an electrical voltage can be applied between the first and second contact surfaces; a current measuring device, wherein the current measuring device is arranged and positioned such that, during operation of the system, the current measuring device detects a measure of a current flowing through the ferroelectric medium between the first electrical contact and the second electrical contact; an actuator, wherein the actuator is arranged and positioned such that, during operation of the system, the actuator causes a relative movement between the first contact surface and the mount; and a control and regulating device, wherein the control and regulating device is operatively connected to the actuator such that during operation of the system the actuator receives an actuator control signal from the control and regulating device, wherein the control and regulating device is operatively connected to the current measuring device such that during operation of the system the control and regulating device receives the measure of current from the current measuring device, wherein the control and regulating device is operatively connected to the voltage source such that during operation of the system the voltage source is operatively connected to the control and regulating device such that, during operation of the system, the voltage source receives a voltage control signal from the control and regulating device, wherein the control and regulating device is configured such that, during operation of the system, the control and regulating device generates and outputs the actuator control signal such that the first contact surface sweeps over the first side surface section of the ferroelectric medium received on the mount, and the control and regulating device generates and outputs the voltage control signal, during operation of the system, in such a way that a deviation of the value for the current from a value for a nominal poling current is minimised.

BACKGROUND

Ferroelectric media, in particular ferroelectric crystals, often exhibit a high degree of non-linearity when interacting with electromagnetic fields. Ferroelectric media also comprise the advantage that they can be poled in sections or repoled in sections based on a given homogeneous polarity of the respective medium.

This possibility of forming domains or volume segments in sections with different, preferably opposite, orientations of their spontaneous polarisation makes ferroelectric media suitable for quasi-phase matching. In non-linear optical processes, one or more electromagnetic fields are passed through a propagation medium with non-linear susceptibility in order to generate one or more new electromagnetic fields with a different frequency. For this to succeed efficiently, the generated elementary waves must be in phase, i.e. comprise a fixed relationship between their oscillations. Only then does destructive interference not occur and the efficiency of the conversion remains high. Even in media that do not fulfil this phase matching condition, it is possible to effectively avoid destructive interference by aligning or reversing the orientation of the spontaneous polarisation in different sections of the non-linear medium. The phases of the generated elementary waves from a repoled volume segment experience a phase jump compared to generated elementary waves from a non-repoled volume segment. This makes it possible to constructively add up the electromagnetic fields over long propagation distances. A number of methods for poling or repoling ferroelectric media are known from the prior art. All of them assume that a ferroelectric medium with an identical orientation of spontaneous polarisation over the length of the medium is provided. Individual volume segments are then selectively poled or repoled by applying an electric field so that they comprise an orientation of spontaneous polarisation that deviates from the initially specified orientation.

The aim is increasingly to implement more complex poling structures in ferroelectric materials. Such more complex structures are difficult to implement using conventional poling methods, such as poling with the help of electrode masks, which are applied to opposite first and second side surfaces of the respective medium.

Caligraphic poling has proven to be well suited to providing complex spatial poling structures in ferroelectric media. In this process, the contact surface of a first electrical contact, preferably in the form of a needle, is moved on a first side surface in such a way that it serially sweeps over the individual surface sections that delimit the volume segments to be poled. A second side surface of the ferroelectric medium, which is opposite the first side surface, is typically completely covered by a flat, planar electrode. The poling structure is thus to a certain extent 'written' into the ferroelectric medium.

This caligraphic poling known from prior art leads to good results with thin ferroelectric media, but fails when poling thick media. The ferroelectric media under consideration exhibit clearly anisotropic poling behaviour. This means that the voltage required for poling between the two electrodes varies considerably along the direction of movement of the first contact surface on the first side surface of the ferroelectric medium.

The anisotropic poling behaviour of the ferroelectric medium can be compensated for by regulating the voltage between the first and second electrical contacts as a function of the current flowing between the first and second electrical contacts, so that a predetermined target current is maintained and the current flowing along the path of movement of the first contact surface is essentially constant. Surprisingly, however, this compensation is only successful for comparatively thin ferroelectric media.

SUMMARY

In contrast, it is an object of the present invention to provide a method and a device for poling a ferroelectric medium which are also suitable for thick ferroelectric media. Furthermore, it is an object of the present invention to provide a method and a device for poling a ferroelectric medium which enable complex poling structures to be provided.

At least one of the aforementioned objects is solved by a method for poling a ferroelectric medium according to the appended independent claim 1. For this purpose, in the method of the type mentioned at the beginning, the second electrical contact is an ionic conductor. Then, the detected measure of the current flowing between the first electrical contact and the second electrical contact is the measure of the poling current.

The poling current refers to the current flowing through the ferroelectric medium due to the repoling. The poling current is proportional to the reversed polarity per time. The area to be considered here is the area of a surface section of the first side surface that bounds a repoled volume segment that is reversed in a period of time. The poling current for a complete repoling, in which the original spontaneous polarisation and the reversed spontaneous polarisation are 180 degrees opposite to each other, is then given as $$I_{pol}=2 \cdot P_S \cdot A/t$$

wherein $P_S$ is the spontaneous polarisation of the medium and A/t is the repoled area A per time t. If the voltage applied to repole can be controlled to the poling current, the poling anisotropy can be compensated.

It has been found that the metallic conductors used in the prior art for the second electrical contact do not lead to the desired result, namely homogeneous repoled volume segments, at least with thick ferroelectric media. This is due to the fact that metallic conductors, which are based on electron conduction, form an ohmic contact with the ferroelectric medium in the area of the domain walls with the second side surface of the ferroelectric medium. However, the ohmic contact means that the current flowing through the ferroelectric medium between the contacts and recorded for the regulation of the poling voltage is primarily determined by parasitic currents along the domain walls formed between the repoled and non-repoled volume segments. These domain walls are highly electrically conductive. Therefore, the current flowing between the first and second electrical contacts as measured in the prior art is composed of the poling current and a parasitic current along the domain walls. Therefore, in the case of an ohmic contact in the area of the domain walls, the voltage is not controlled to the poling current, but rather to the parasitic current along the domain walls. Compensation of the anisotropic poling behaviour of the ferroelectric medium is not or only insufficiently possible in this way.

The present invention is therefore based on the idea of forming the second electrical contact as an ion conductor. An ion conductor forms a non-resistive, diode-like contact with the ferroelectric medium, at least in the area of the domain walls. This suppresses the parasitic currents that are caused by the domain walls and makes it possible to control the voltage to the poling current.

The first and second volume segments of the ferroelectric medium are often referred to as domains of the medium or crystal. Here, a domain of the ferroelectric medium refers to a contiguous volume segment of the ferroelectric medium in which the spontaneous polarisation of the ferroelectric medium comprises the same orientation. The first and second side surface sections of the first volume segment on the opposite first and second side surfaces of the ferroelectric medium define the first volume segment, i.e. they delimit its volume. The third and fourth side surface sections of the second volume segment on the opposing first and second side surfaces of the ferroelectric medium define the second volume segment, i.e. they limit its volume.

To stimulate domain growth, an electrical voltage is applied between the two contact surfaces. The polarity of the voltage depends on the orientation of the medium and the voltage level depends on the thickness and coercivity of the ferroelectric medium to be poled. According to the present invention, the polarity also depends on the blocking direction of the diode-like contact between the second electrical contact and the second side surface in the area of the domain walls. Both a constant and a time-varying, pulsed voltage can be applied. In an embodiment of the invention, the voltage is 1000 volts or more.

It will be understood that the voltage must be applied between the first and second electrical contacts at a plurality or all of the points that are swept by the first contact surface within the first side surface section.

For the purposes of the present application, the length of the ferroelectric medium or of a volume segment is defined as its extension in the desired direction of propagation of the electromagnetic radiation in the ferroelectric medium. This direction of propagation is also referred to as the longitudinal direction of the ferroelectric medium. The thickness refers to the extension of the ferroelectric medium in a thickness direction, wherein the thickness direction is perpendicular to the longitudinal direction and perpendicular to the second contact surface. The thickness direction typically coincides with the orientation of the spontaneous polarisation. The width of the ferroelectric medium is its extension in a width direction perpendicular to the longitudinal direction and perpendicular to the thickness direction.

In an embodiment of the invention, the surface normals of the first and second side surfaces of the ferroelectric medium are parallel to each other but point away from each other.

In an embodiment, such a ferroelectric medium has a thickness perpendicular to the second contact surface of 500 μm or more.

It is understood that the first side surface section, which delimits the first volume segment on the first side surface, is smaller than the first side surface. The second side surface section, which delimits the first volume segment on the second side surface, is smaller than the second side surface. Preferably, the first and second side surface sections of a first volume segment are each substantially congruent with each other.

In an embodiment of the invention, the relative movement between the first contact surface and the first side surface section of the ferroelectric medium is carried out successively in two mutually perpendicular directions. In an embodiment of the invention, the relative movement is carried out line by line. In an embodiment, the first contact with the first contact surface is first moved in a first direction along a first line. Then the first contact surface is moved in a second direction perpendicular to the first direction into a second line, in order to then be moved again in or against the first direction along the second line.

In an embodiment alternative to this, the relative movement between the first contact surface and the first side surface section of the ferroelectric medium is carried out along a single, preferably linear, line. If the ferroelectric medium comprises a plurality of first side surface sections, the first contact surface carries out a relative movement along exactly one, preferably linear, line for each first side surface section in an embodiment. In an embodiment, the, preferably linear, line runs in the thickness direction of the ferroelectric medium. In an embodiment, the linear line runs at an angle other than 90 degrees to the longitudinal direction. The relative movement along a single line for a first side surface section nevertheless enables the repoling of first volume segments with a finite, defined expansion in the longitudinal direction due to the course of the field lines extending from the first contact surface to the second contact surface.

In an embodiment, the voltage is controlled in such a way that the measured current along the line of relative movement is equal to a constant nominal poling current. In an alternative embodiment, the voltage is controlled in such a way that the measured current along the line of relative movement is equal to a nominal poling current that changes along the line. By changing the nominal poling current along the line in the thickness direction of the ferroelectric medium, it is possible to write a first volume segment with a first side surface section with a single sweep of the ferroelectric medium, wherein the first side surface section comprises a changing length in the longitudinal direction of the ferroelectric medium. For example, it is possible in this way to repoling a first volume segment whose first side surface section is trapezoidal.

The serial 'writing' of the first side surface section on the first side surface of the first volume segment enables the design of complex poling structures. An example of such a complex poling structure is a poled ferroelectric medium with a poling period varying in the width direction of the medium.

In an embodiment of the invention, the relative movement between the first contact surface and the ferroelectric medium is carried out such that the first side surface section is trapezoidal. It is understood that for such a trapezoidal shape of the first side surface section, the relative movement between the first electrical contact or its first contact surface and the ferroelectric medium must take place in two mutually perpendicular directions.

In an embodiment of the invention, the first electrical contact is formed by a needle, wherein preferably the first contact surface is a tip of the needle. In an embodiment of the invention, the first electrical contact is a needle made of a hard metal.

In an embodiment, care should be taken to ensure that the needle-shaped element forms a first contact surface that is as smooth as possible.

Since, in an embodiment, the first side surface section of the ferroelectric medium, which delimits the repoled volume segment, extends beyond the area of the first side surface actually swept by the first contact surface due to the field lines, in an embodiment of the invention the first electrical contact only partially sweeps the first side surface section. In an embodiment of the invention, the first electrical contact completely sweeps over the first side surface section. In an embodiment of the invention, the measure of the current is measured indirectly, wherein a current between the second contact and ground is used as the indirect measurement. Since there are no current sinks or sources in the ferroelectric medium, this current between the second contact and ground also corresponds to the poling current through the ferroelectric medium according to the invention.

Applying the first or second contact surface to the respective first or second side surface section comprises mechanically bringing the respective contact surface into contact with the side surface section, so that when an electrical voltage is applied between the first electrical contact and the second electrical contact, an electric field extends between the first contact surface and the second contact surface.

In principle, the method according to the invention is suitable for producing a ferroelectric medium with exactly two volume segments, i.e. the first volume segment and the second volume segment, with different orientations of the spontaneous polarisation. In this case, only a repoling of the ferroelectric medium is caused in the first volume segment.

However, structures for quasi-phase matching predominantly comprise a large number of domains or volume segments. Domains with different spontaneous polarisation are positioned alternately. In an embodiment, such an arrangement of the volume segments is periodic, i.e. in the direction of a beam of electromagnetic radiation propagating through the ferroelectric medium, the first and second volume segments form a repeating structure. However, embodiments with an aperiodic positioning of a plurality of first and second volume segments are also possible. In an embodiment, the first and second volume segments with different spontaneous polarisation from each other have the same length in the longitudinal direction.

Therefore, in an embodiment, the ferroelectric medium comprises a plurality of first volume segments and a plurality of second volume segments after carrying out the method according to the invention, wherein the first and second volume segments alternate with each other in the beam direction. It is understood that, for producing a poled ferroelectric medium comprising a plurality of first volume segments and a plurality of second volume segments, the plurality of first volume segments is to be formed or written with the steps defined in the independent claim.

In an embodiment, the second contact surface of the second electrical contact covers only the second side surface section of the second volume segment or the second side surface sections of all second volume segments. In an embodiment, the second contact surface of the second electrical contact additionally also covers the fourth side surface section of the second volume segment or the fourth side surface sections of all second volume segments.

In an embodiment of the invention, the first electrical contact is set into an oscillating motion during the carrying out of the relative movement with respect to the ferroelectric medium, so that the first contact surface oscillates at least in the plane of the first side surface or perpendicular to the plane of the first side surface. Such an oscillatory movement reduces the static friction between the electrical contact and the side surface of the ferroelectric medium during the sweeping of the first side surface section.

In an embodiment of the invention, the method further comprises the step of: carrying out the relative movement between the first contact surface and the ferroelectric medium, wherein the ferroelectric medium is heated, preferably to a temperature above room temperature (21° C.). The temperature of the ferroelectric medium at which the repoling takes place is also referred to as the poling temperature. In an embodiment of the invention, the ferroelectric medium is heated to a temperature of 50° C. or more, preferably 100° C. or more. In an embodiment of the invention, the temperature of the heated ferroelectric medium during repoling is lower than the Curie temperature of the respective ferroelectric medium.

Writing the poling structure at an elevated temperature of the ferroelectric medium reduces the poling anisotropy. However, without further measures, heating would require the second contact to be a metallic conductor that can withstand the increased temperatures over the period of repoling. When using an ionic conductor according to the invention, it is important to prevent the ionic conductor from evaporating.

The anisotropic poling behaviour of the ferroelectric medium can be almost completely compensated for by heating and simultaneously regulating the voltage to the poling current.

In an embodiment of the invention, the ferroelectric medium can be heated using an electromagnetic radiation source, for example with an IR lamp or in a microwave oven, a heat bath or a contact-coupled heating plate.

In an embodiment of the invention, the second electrical contact comprises a solid or liquid electrolyte. An electrolyte is a chemical compound which is dissociated into ions in the solid or liquid state and which move directionally under the influence of an electric field. The conduction of the electric current in such an electrolyte is ionic. The electrical conductivity of such ionic conductors is typically lower than that of metals, for example, with their electronic conduction. Electrolytes are therefore also referred to as second-class conductors.

All solids and all liquids that contain mobile ions at the temperature at which the repoling takes place can be used as electrolytes.

In an embodiment of the invention, the electrolyte is NaCl, LiCl or $CaCl_2$.

In an embodiment of the invention, the second electrical contact comprises a liquid solvent.

In an embodiment of the invention, the liquid solvent is water or glycerol.

In an embodiment of the invention, the solution of the electrolyte in a liquid has a boiling point higher than the poling temperature.

Examples of a suitable liquid ion conductor is a salt solution with glycerol as solvent and a salt, for example NaCl, LiCl, $CaCl_2$ as electrolyte. In an embodiment, the ion conductor is a saturated solution of $CaCl_2$ as electrolyte in $H_2O$ as solvent. Such a salt solution comprises a boiling temperature of more than 200° C.

Ferroelectric media within the meaning of the present application comprise in particular ferroelectric, non-linear optical crystals, for example of lithium niobate, lithium tantalate, potassium titanylphoshpate or barium magnesium fluoride.

In an embodiment of the invention, the ferroelectric medium is an oxide crystal or a fluoride crystal. Examples of oxide crystals are: $LiNbO_3$, $LiTaO_3$, $KTiOPO_4$, $LaBGeO_5$. An example of a fluoride crystal is $BaMgF_4$.

In an embodiment, the lithium niobate or the lithium tantalate is doped with MgO. In an embodiment, the lithium niobate or the lithium tantalate is congruent or stoichiometric.

In an embodiment of the invention, the method further comprises the step of: applying an oil to the first side surface around the first electrical contact. Such an oil is used to prevent corona discharge in the vicinity of the first electrical contact. An example of a suitable oil is silicone oil, for example transformer oil. Such an oil comprises a boiling temperature which is larger than the poling temperature.

In an alternative embodiment, the environment of the ferroelectric medium is exposed to a suitable inert gas, for example sulphur hexafluoride ($SF_6$).

At least one of the aforementioned objects is also solved by a system for poling a ferroelectric medium according to the attached independent claim directed thereto. For this purpose, the system of the type mentioned at the beginning comprises an ion conductor as a second electrical contact.

Insofar as aspects of the invention have been described above with regard to the method for poling a ferroelectric medium, these also apply to the corresponding system for poling the ferroelectric medium and vice versa. Insofar as the method is carried out with a system according to the present invention, this system comprises the corresponding devices for this purpose. In particular, embodiments of the system are suitable for carrying out the embodiments of the method described above.

In an embodiment of the invention, the ion conductor of the second electrical contact is formed by impregnating a non-woven fabric with the liquid solution of electrolyte and solvent. The ferroelectric medium is then placed on this impregnated non-woven fabric. The non-woven fabric prevents direct electrically conductive contact with a metallic electrode positioned under the non-woven fabric, which is required to apply voltage to the ionic conductor.

BRIEF DESCRIPTION OF THE DRAWINGS

Further advantages, features and possible applications of the present invention become apparent from the following description of embodiments and the associated figures. In the figures, like elements are denoted by identical reference numbers.

DETAILED DESCRIPTION

The method for poling a ferroelectric medium 2 according to the present invention is explained with reference to two embodiments of the system 1. The aim of the method described here by way of example is to write a complex poling structure in a non-linear optical lithium niobate crystal 2 as a ferroelectric medium.

Figures 1, 2:
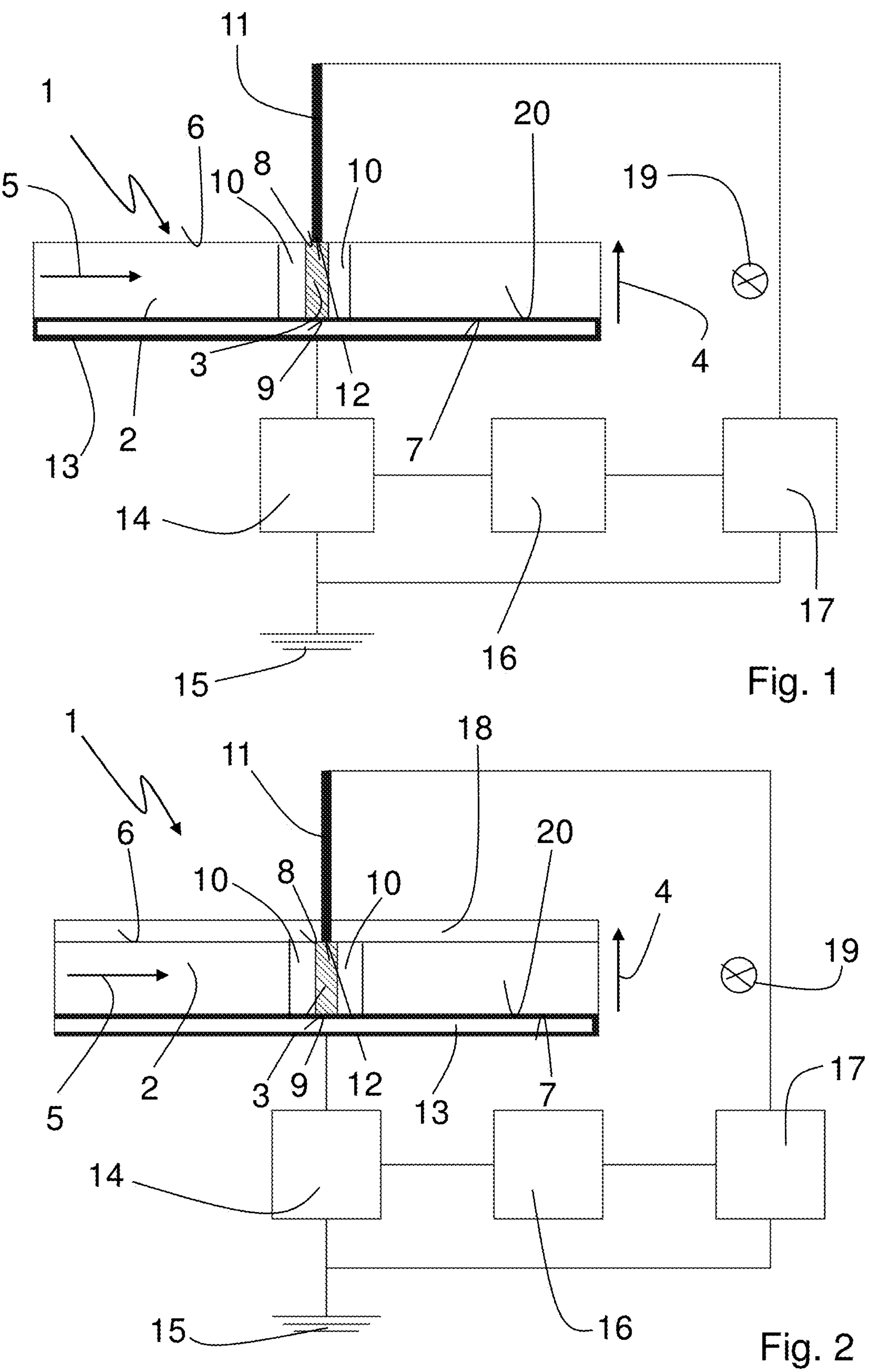
FIG. 1 is a schematic representation of an embodiment of a system for poling a ferroelectric medium according to the invention.
FIG. 2 is a schematic representation of a further embodiment of a system for poling a ferroelectric medium according to the invention.

FIGS. 1 and 2 each show a schematic side view of a system for poling the lithium niobate crystal 2. Each of the representations in FIGS. 1 and 2 shows a top view from the side of the longitudinal extension of the crystal 2.

In FIGS. 1 and 2, only a single first volume segment or first domain 3 and the two neighbouring second volume segments or second domains 10 are shown as examples in the crystal 2.

For the purposes of the present invention, the thickness of the crystal is defined as its extension in the thickness direction denoted by the reference number 4. In contrast, the length of the crystal is measured in the longitudinal direction 5. The beam axis of the electromagnetic radiation when using the crystal 2 also extends in the longitudinal direction 5. The electromagnetic radiation would propagate through the crystal 2 from left to right or vice versa in the longitudinal direction 5 when the poled crystal 2 is used in a non-linear optical process.

Each of the crystals 2 comprises a first side surface 6 and a second side surface 7. Each first domain 3 is delimited on the first side surface 6 by a first side surface section 8 and on the second side surface 7 by a second side surface section 9. In other words, the first and second side surface sections 8, 9 delimit the volume of the first domain 3 in the longitudinal direction 5 and in a width direction 19 perpendicular to the longitudinal direction 5 and the thickness direction 4.

After carrying out the method according to the invention, each of the crystals 2 comprises a periodic poling structure, i.e. first and second domains 3, 10 repeat regularly. Moreover, in a cross-sectional plane parallel to the longitudinal direction 5 and perpendicular to the width direction 19 of the crystal 2 in the embodiment shown, all first and second domains 3, 10 have the same length. This can be clearly seen in FIG. 3, which is a top view of the crystal 2 in FIG. 3.

Figure 3:
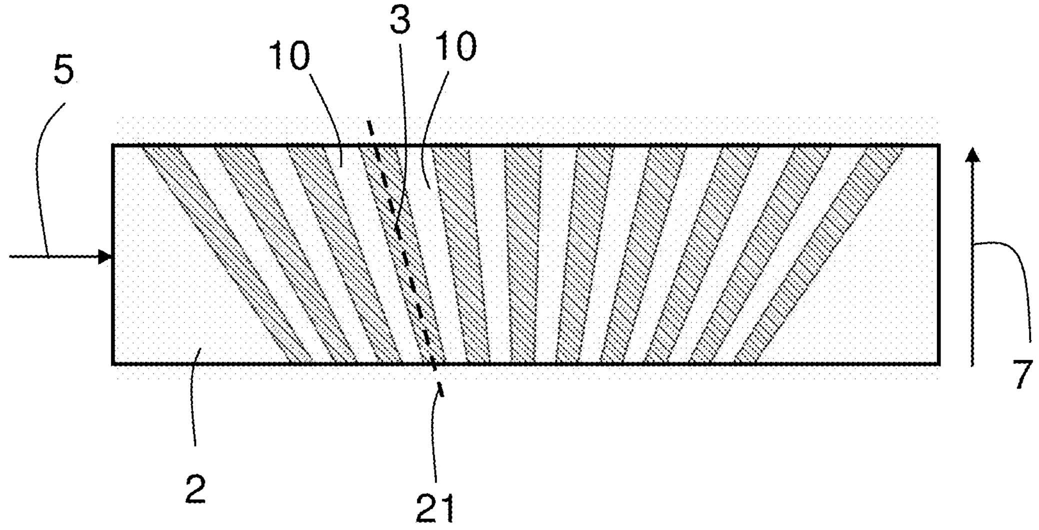
FIG. 3 is a schematic top view of a non-linear optical crystal poled with a system of FIG. 1 or 2.

FIG. 3 shows a possible complex poling structure of the crystal 2, which can be generated using the method and the system. In the embodiment of FIG. 3, the ready-poled crystal 2 has a periodic poling structure with alternately positioned first and second domains 3, 10, wherein the length of the first and second domains 3, 10 and thus also the periodicity of the poling structure varies in the width direction 7 of the crystal 2.

For poling, an electrical voltage is applied between a first contact 11 with a first contact surface 12 on the first side surface 6 and a second contact 13 on the second side surface 7 of the crystal 2. By applying the electrical voltage between the two contacts 11, 13, the spontaneous polarisation of the crystal within the first domains 3 is permanently oriented differently from the original spontaneous polarisation of the crystal 2. However, this original spontaneous polarisation is retained in the second domains 10. In the embodiments shown, after poling or repoling the first domains 3, the spontaneous polarisation of the crystal in the first domains 3 and the spontaneous polarisation in the second domains 10 are opposite to each other.

The basic idea of the method and system 1 of the present invention is to be able to pole crystals with a thickness in the thickness direction 4 of more than 500 μm in such a way that the anisotropic polarisation behaviour of the crystal 2 can be compensated. Without further measures, the electric field between the first and second contacts 11, 13, which is required to repole the crystal 2 within the volume segment 3 delimited by the first and second side surface sections 6, 7, varies along the travel path of the first contact surface 12 within the first side surface section 8.

When repoling the first domains 3, the first contact surface 12 of the first contact 11 sweeps over the respective first side surface section 8 of the first side surface 6 of the crystal 2 along exactly one linear line 21. In the embodiment shown, a needle forms the first contact 11. Such an embodiment allows complex poling structures, such as those described with reference to FIG. 3, to be 'written' without the poling anisotropy of the crystal 2 leading to an inhomogeneous repoling of the spontaneous polarisation in the first domains 3. To ensure that the first side surface section 8 comprises a trapezoidal shape, i.e. a length that changes in the longitudinal direction 5, despite the first side surface section 8 being swept only once along the line 21, the nominal poling current is varied during the relative movement.

To compensate for the polarity anisotropy of the crystal 2, the method according to the invention relies on current control of the electrical voltage applied between the first contact 11 and the second contact 13. The control loop is arranged in such a way that the current is adjusted to the nominal poling current changing in the thickness direction 7 of the crystal 2. For this purpose, an amperemeter 14 is used as a current measuring device to measure the current flowing between the first contact 11 and the second contact 13. This measure for the current is measured between ground 15 and the second contact 13. Assuming that the crystal comprises no charge carrier sources or charge carrier sinks, this current between the second contact 13 and ground 15 depends directly and exclusively on the poling current flowing through the crystal 2 itself, in accordance with the invention. A control and regulation device 16 now regulates the voltage source 17 in such a way that the measure of the poling current measured by the amperemeter 14 comprises the smallest possible deviation from the specified nominal poling current.

In the prior art, it has proven problematic that second contacts in the form of electronic conductors, such as a metal layer on the second side surface 7 of the crystal 2, form an ohmic contact with the crystal 2 in the area of the domain walls. In this case, however, the measured current is not the poling current, but is strongly distorted, as the current conduction through the crystal 2 is determined by a current flow along the domain walls, i.e. the interfaces between the first domains 3 and the neighbouring second domains 10. In contrast, the second contact 13 in the system 1 according to the invention is an ionic conductor. Such an ionic conductor provides a diode-like contact in the area of the domain walls, so that no significant parasitic current flows along the domain walls to the second contact 13 if the polarity is appropriate. The measured current is then essentially equal to the poling current.

In the embodiments shown, the ionic conductor is a solution of lithium chloride as electrolyte and glycerol as solvent. This solution for the electrical contact 13 comprises a comparatively high boiling point, so that the crystal 2 can be heated to 150° C. during the writing of the poling structure without the second electrical contact 13 evaporating significantly during repoling.

In an embodiment of the system 1 shown in FIG. 2, an oil film 18 is also applied to the first side surface 6 of the crystal. This prevents the occurrence of corona discharges in the area of the first contact surface 12 of the first contact 11.

For the purposes of the original disclosure, it is pointed out that all features, as they are apparent to a person skilled in the art from the present description, the drawings and the claims, even if they have been described specifically only in connection with certain further features, can be combined both individually and in any combination with other features or groups of features disclosed herein, unless this has been expressly excluded or technical circumstances make such combinations impossible or meaningless. A comprehensive, explicit description of all conceivable combinations of features is omitted here only for the sake of brevity and readability of the description.

Whilst the invention has been illustrated and described in detail in the drawings and the preceding description, this illustration and description is given by way of example only and is not intended to limit the scope of protection as defined by the claims. The invention is not limited to the disclosed embodiments.

Variations of the disclosed embodiments will be obvious to those skilled in the art from the drawings, the description and the appended claims. In the claims, the word 'comprising' does not exclude other elements or steps, and the indefinite article 'a' does not exclude a plurality. The mere fact that certain features are claimed in different claims does not exclude their combination. Reference numbers in the claims are not intended to limit the scope of protection.

LIST OF REFERENCE NUMBERS

1 system
2 lithium niobate crystal
3 first domain
4 thickness direction
5 longitudinal direction
6 first side surface
7 second side surface
8 first side surface section
9 second side surface section
10 second domain
11 first contact
12 first contact surface
13 second contact
14 amperemeter
15 ground
16 control and regulation device
17 voltage source
18 oil film
19 thickness direction
20 second contact surface
21 straight line

What is claimed is:

1. A method for poling a ferroelectric medium (2) comprising a first side surface (6) and a second side surface (7) positioned opposite the first side surface (6), such that the ferroelectric medium (2) comprises a first volume segment (3) and a second volume segment (10),
- wherein the spontaneous polarisation of the ferroelectric medium (2) comprises a first orientation in the first volume segment (3) and a second orientation in the second volume segment (10),
- wherein the first orientation and the second orientation differ from one another,
- wherein the first volume segment (3) is defined by a first side surface section (8) of the first side surface (6) and a second side surface section (9) of the second side surface (7), and
- wherein the second volume segment (10) is defined by a third side surface section of the first side surface (6) and a fourth side surface section of the second side surface (7), and
- wherein the method comprises the steps of:
- providing the ferroelectric medium (2),
- applying a first contact surface (12) of a first electrical contact (11) to the first side surface section (8),
  - wherein the first contact surface (12) is smaller than the first side surface section (8),
- applying a second contact surface (20) of a second electrical contact (13) to the second side surface (7),
  - wherein the second contact area (20) covers at least the second side surface section (9),
- applying an electrical voltage between the first electrical contact (11) and the second electrical contact (13),
- carrying out a relative movement between the first contact area (12) and the ferroelectric medium (2) so that the first contact area (12) sweeps over the first side surface section (8),
- detecting a measure of a current flowing between the first electrical contact (11) and the second electrical contact (13) through the ferroelectric medium (2), and
- controlling the electrical voltage so that a deviation of the current from a nominal poling current is minimised, and
- wherein the second electrical contact (13) is an ion conductor.

2. The method according to claim 1, wherein the method further comprises the step of heating the ferroelectric medium (2) during carrying out the relative movement between the first contact surface (12) and the ferroelectric medium (2), preferably heating the ferroelectric medium (2) to a temperature of 50 degrees Celsius or more.

3. The method according to claim 1, wherein the relative movement between the first contact surface (12) and the ferroelectric medium (2) is carried out in such a way that the first side surface portion (8) is trapezoidal.

4. The method according to claim 1, wherein the relative movement between the first contact surface (12) and the ferroelectric medium (2) is carried out in such a way that the first contact surface (12) sweeps along the first side surface section (8) exactly along a preferably linear line (21).

5. The method according to claim 4, wherein the nominal poling current is varied along the line (21).

6. The method according to claim 1, wherein the second electrical contact (13) comprises a solid or liquid electrolyte.

7. The method according to claim 6, wherein the second electrical contact (13) comprises a liquid solvent.

8. The method according to claim 7, wherein the solvent is glycerol.

9. The method according to claim 6, wherein the electrolyte is lithium chloride.

10. The method according to claim 1, wherein the ferroelectric medium (2) is an oxide crystal or a fluoride crystal.

11. A method according to claim 1, further comprising the step of applying an oil on the first side surface (6) around the first electrical contact (11).

12. The method according to claim 6, wherein the second electrical contact comprises a liquid solvent, wherein the solvent is glycerol, and wherein the electrolyte is lithium chloride.

13. The method according to claim 2, wherein the relative movement between the first contact surface and the ferroelectric medium is carried out in such a way that the first side surface portion is trapezoidal, wherein the relative movement between the first contact surface and the ferroelectric medium is carried out in such a way that the first contact surface sweeps along the first side surface section exactly along a linear line, wherein the nominal poling current is varied along the linear line, wherein the second electrical contact comprises a solid or liquid electrolyte, wherein the second electrical contact comprises a liquid solvent, wherein the solvent is glycerol, wherein the electrolyte is lithium chloride, and wherein the ferroelectric medium is an oxide crystal or a fluoride crystal.

14. A system (1) for poling a ferroelectric medium (2) comprising a first side surface (6) and a second side surface (7) positioned opposite the first side surface (6) so that the ferroelectric medium (2) comprises a first volume segment (3) and a second volume segment (10), wherein the system, comprises:

a mount for holding the ferroelectric medium (2) during operation of the system (1), a first electrical contact (11) comprising a first contact surface (12), wherein the first electrical contact (11) is arranged and positioned such that the first contact surface (12) can be applied to a first side surface section (8) of the first side surface (6) of the ferroelectric medium (2) held on the mount during operation of the system (1), a second electrical contact (13) comprising a second contact surface (20), wherein the second electrical contact (13) is arranged and positioned such that the second contact surface (20) can be applied to a second side surface section (9) of the second side surface (7) of the ferroelectric medium (2) received in the mount during operation of the system (1), an electrical voltage source, wherein the voltage source is connected to the first electrical contact (11) and the second electrical contact (13) in such a way that, during operation of the system (1), a voltage can be applied between the first and second contact surfaces (12, 20), a current measuring device (14), wherein the current measuring device (14) is arranged and positioned in such a way that, during operation of the system (1), the current measuring device detects a measure of a current flowing between the first electrical contact (11) and the second electrical contact (13) through the ferroelectric medium (2), an actuator, wherein the actuator is arranged and positioned such that during operation of the system (1) the actuator causes a relative movement between the first contact surface (11) and the mount, and a control and regulating device (16), wherein the control and regulating device (16) is operatively connected to the actuator in such a way that, during operation of the system (1), the actuator receives an actuator control signal from the control and regulating device (16), wherein the control and regulating device (16) is operatively connected to the current measuring device (14) in such a way that, during operation of the system (1), the control and regulating device (16) receives a measure of the poling current from the current measuring device (14), wherein the control and regulating device (16) is operatively connected to the voltage source (17) in such a way that, during operation of the system (1), the voltage source (17) receives a voltage control signal from the control and regulating device (16), and wherein the control and regulating device (16) is configured in such a way that during operation of the system (1), the control and regulating device (16) generates and outputs the actuator control signal in such a way that the first contact surface (12) sweeps the first side surface section (8) of the ferroelectric medium (2) held on the mount, and during operation of the system (1), the control and regulating device (16) generates and outputs the voltage control signal in such a way that a deviation of the value for the current from a value for a nominal poling current is minimised, and wherein the second electrical contact (13) is an ion conductor.

15. The system according to claim 14, wherein the first electrical contact (11) is a needle and the first contact surface (12) is a tip of the needle.

* * * * *